United States Patent [19]

Richard

[11] 3,879,339

[45] Apr. 22, 1975

[54] MANUFACTURE OF SOLID OR HOLLOW BODIES FROM A COMPOSITION CONTAINING A GRANULAR FILLER

[75] Inventor: Gerard Y. Richard, Precy-sur-Oise, France

[73] Assignee: Societe d'Applications de Produits Industriels et Chimiques

[22] Filed: Aug. 10, 1972

[21] Appl. No.: 279,744

[30] Foreign Application Priority Data
Aug. 16, 1971  France .............................. 71.29865

[52] U.S. Cl. .............. 260/38; 164/16; 260/DIG. 40
[51] Int. Cl. ............................................. C08g 51/04
[58] Field of Search .......... 260/DIG. 40, 38; 164/16

[56] References Cited
UNITED STATES PATENTS

| | | | |
|---|---|---|---|
| 3,008,205 | 11/1961 | Bloies ............................ | 164/16 X |
| 3,108,340 | 10/1963 | Peters et al. ..................... | 164/16 X |
| 3,184,814 | 5/1965 | Brown .......................... | 260/DIG. 40 |
| 3,639,654 | 2/1972 | Robins ............................. | 164/16 X |

*Primary Examiner*—Donald E. Czaja
*Assistant Examiner*—S. M. Person

[57] ABSTRACT

A molding composition containing at least one granular filler which is intimately mixed with at least one organic resin containing an acid curing agent, after shaping and clamping the composition, is cured at the ambient temperature and over a period of between a few seconds and a few minutes by means of an aerosol or a gas obtained by combining sulphur dioxide and an oxidising agent, the said oxidising agent, in the particular case of oxygen, being introduced in the form of a gas separately or conjointly into the said composition, and in all other cases, either having been introduced first into the composition, or being initially combined with the sulphur dioxide to form a chemical compound which can be dissociated easily.

8 Claims, No Drawings

MANUFACTURE OF SOLID OR HOLLOW BODIES FROM A COMPOSITION CONTAINING A GRANULAR FILLER

The present invention relates to a process for the manufacture of a solid or hollow body, from a composition comprising at least one granular filler which is intimately mixed with one or more organic resins containing an acid curing agent.

This process is applicable more particularly to the manufacture of solid or hollow bodies which are used, respectively, for coring or for moulding castings in founding. It is also applicable to other uses when it is necessary to bind a granular filler, consisting for example of a sand, a refractory and/or abrasive material, metal oxides or concrete, by means of an organic resin which polymerises in situ under the action of an acid curing agent (manufacture of blocks of refractory materials and of abrasive parts such as grinding wheels and manufacture of moulded or cast construction materials intended for the building industry and for civil engineering).

The curing of granular fillers, for example sand, is usually carried out, especially in founding, according to two distinct techniques: the so-called "hot box" method which required a supply of heat and conversely, the so-called "cold box" method which takes place at ambient temperature.

The so-called hot box method, which consists of injecting sand mixed with a thermosetting resin into a box heated to a temperature of the order of 200°, possesses disadvantages because of the fact that, theoretically, it requires a large supply of heat and that thereafter it does not always give satisfactory results with regard to the metallurgical soundness of the moulded or cored objects; furthermore, this process has the disadvantage of being slow, of the order of several hours.

The so-called cold box method is a more recently known technique for curing granular materials under cold conditions, but several processes have already been proposed.

A process for agglomerating sand mixed with a sodium silicate is especially known, which consists of dispersing carbon dioxide within the shaped granular mass. The gas thus decomposes the silicate into a silica gel which plays the role of an inorganic binder, and into sodium carbonate. The carbonate thus formed is a great disadvantage because it is a flux for the silica and, because of this, it lowers the refractory point of the mould or the core to below 1,400°. In addition to the large defects which the cast parts produced with such moulds or cores can have, it is frequently found that the cast parts are inadequate from the point of view of the results necessary in founding, which increases the trimming cost; as a result, this curing process using carbon dioxide tends to be used less and less.

In an attempt to eliminate the disadvantages of sodium silicate, an inorganic binder, a process which uses resins of the phenolic type, cured by a polyisocyanate and catalysed by an injection of amine at the time of using the granular filler, in the present instance sand, has already been developed. The copious evolution of gas during the casting of the metal, caused by the presence of the polyisocyanate, renders this process useless for the manufacture of large parts or parts which are sensitive to porosity.

The only curing process under cold conditions which currently gives perfect technological results consists of causing the curing and the agglomeration of the granular filler by means of a synthetic resin containing an acid curing agent, this being a resin of the urea/formaldehyde, phenol/formaldehyde, furane or furane copolymer type, optionally modified by furfuryl alcohol or by unsaturated or epoxidised compounds. Although this process is of very great value because, firstly, it makes it possible markedly to reduce the volume of gases given off during the casting of the liquid metal and because, secondly, it requires a shorter use time, the development of the said process has hitherto been hindered since it has not been possible to regulate the time necessary for the polymerisation of the synthetic resin, in order to cause curing and the agglomeration of the granular filler, in relation to the industrial applications concerned, since it is either too long (of the order of 20 minutes to several hours), or too short, that is to say immediate, violent and unselective, the violent and destructive character of the reaction being very marked, whilst for the industrial applications the ideal time for curing the resin should be of the order of a few seconds (1 to 5 seconds, in order that the distribution of the curing is uniform) to about 1 minute.

In effect, amongst the acid curing agents used hitherto, it has been observed that: (a) sulphur trioxide $SO_3$, proposed in U.S. Pat. No. 3,145,438, injected in the form of a gas into the mixture of sand and resin, causes an instantaneous curing of the resin in the region subjected to the action of the sulphur trioxide, which impedes the diffusion of this gas to other parts, especially the central parts of the mixture, and hence it is impossible to manufacture a hard and homogeneous founding mould or core. Furthermore, $SO_3$ cannot be measured because it is dispensed in the form of a gas; because of the fact that $SO_3$ is the only active compound in the curing reaction, additional non-uniformity is observed in this reaction since the concentration of $SO_3$ can vary from place to place within the injected mixture; (b) Sulphur dioxide $SO_2$, chlorine, hydrobromic acid, hydroiodic acid, hydrochloric acid, ammonium chloride, maleic anhydride, phthalic anhydride, phosphoric acid, sulphuric acid, hydrogen sulphide and organic acids such as formic acid and para-toluenesulphonic acid, proposed in French Patent No. 1,198,673 and its first addition No. 76,327, (U.S. Pat. No. 3,008,205) have an action which is too slow or too heterogeneous to be applicable in industry; in effect, this action must be such that it gives a relatively short use time — since the coating comprises simultaneously the resin and the acid — and a necessarily long curing time since the polymerisation curve must provide a sufficient use time. It has been found, for example, that the use of $SO_2$ alone only results in an infinitely slow reaction (about 30 minutes) and a very poor yield: under cold conditions, only a small amount of sulphur dioxide is converted into sulphuric acid by the moisture in the air. It would be necessary to go to 400° in the presence of a catalyst of the vanadium oxide type in order to improve the yield.

The present invention aims at overcoming these disadvantages by proposing a process for the manufacture of a solid or hollow body from a composition comprising at least one granular filler intimately mixed with one or more organic resins, but this time not containing any curing agent, which allows the composition to have an indefinite use time; the curing of the said composition, brought about by the reaction of a gas or an aerosol with one of the constituents (water, alcohol or oxidising agent) of the composition, only takes place subsequently, this curing having furthermore the advantage of taking place in a very short, but industrially acceptable, time, which, in the majority of cases, is less than 1 minute and more than 1 or 2 seconds.

Another aim of the process according to the invention is to provide solid or hollow bodies intended especially for coring and moulding in founding, as well as for the production of refractory products, the refractory point of which is high, for the manufacture of moulded or cast products as construction materials or intended for civil engineering or for the manufacture of abrasive wheels.

In founding, the process according to the invention is simple and rapid to carry out and it provides solid or hollow bodies which can be used for casting parts which will have all the technologically required qualities. The granular filler, perfectly agglomerated and cured, has high flexural strength.

It is generally thought that, in order to arrive at an industrially viable process, the curing of the synthetic resin must be accelerated by means of sulphuric acid and/or hydrochloric acid, these two inorganic acids being the only ones which can ensure rapid curing.

The originality of the present invention relative to the processes described previously, originates from the fact that the reaction of the curing agent takes place in two stages within the composition itself: first of all, the gas or the aerosol is converted, in the medium, into sulphuric acid, and then this nascent sulphuric acid acts on the resin. This production of nascent sulphuric acid causes a very rapid curing of the composition, which is often even practically instantaneous since it takes of the order of a few seconds.

According to the invention, a process for the manufacture of a solid or hollow body, from a composition comprising at least one granular filler intimately mixed with at least one organic resin containing an acid curing agent, is characterised in that, after shaping and clamping (manual, mechanical, hydraulic or pneumatic) the said composition, the curing of the latter is brought about, at ambient temperature and over a period of between a few seconds and a few minutes, by means of an aerosol or a gas obtained by combining sulphur dioxide $SO_2$ and an oxidising agent, the said oxidising agent, in the particular case of oxygen, being introduced in the form of a gas separately or conjointly into the said composition, and in all other cases, either having been introduced first into the composition, or being initially combined with the sulphur dioxide to form a chemical compound which can dissociate easily.

In a preferred embodiment, the oxidising agent or the oxygen vehicle is of the peroxide, hydroperoxide, hydroxyhydroperoxide, chlorate, perchlorate, chlorite, hydrochloride, perbenzoate, metal oxide, permanganate or monoperphthalic acid type, and, in this case, it is mixed, in the liquid or solid form, with the composition comprising the granular filler and the synthetic resin before being shaped; the oxidising agent is chlorine which is either injected simultaneously into the composition along with the sulphur dioxide, or is initially combined with the latter to form sulphuryl chloride, a compound which, in the presence of one of the constituents of the composition and especially water, hydrolyses easily to form sulphuric acid and hydrochloric acid.

The chemical compounds, enumerated above, are thus compounds of which the speed of reaction is intermediate between that of sulphur dioxide alone, the reaction of which is too slow and which gives a poor yield, and sulphur trioxide alone, the instantaneous curing reaction of which gives rise to curing which is confined to the surface of the composition and is thus heterogeneous, sudden and violent.

It has been found that it was possible to cause all synthetic resins containing an acid curing agent to cure very rapidly at ambient temperature taking a few seconds, by using, as the curing agent, sulphur dioxide combined with an oxidising agent, whether introduced into the composition simultaneously or not simultaneously with the said sulphur dioxide, or sulphuryl chloride in the form of a gas or an aerosol. Curing in this way intended to agglomerate the granular particles coated with a resin film, requires the presence of a high proportion of granular fillers in order to facilitate the passage of the gas or of the aerosol through the bulk of the shaped object.

Amongst the fillers which can be used, there may be mentioned all materials containing a high proportion of silica, such as siliceous sand or concretes, refractory materials, granular metal oxides such as zirconium oxides and sillimanite, and abrasive products such as carborundum and corundum.

All the resins containing an acid curing agent can be used for carrying out the process according to the invention. They are mixed by any known means with the granular filler in proportions which can vary from 0.5 to 10% by weight in order to prepare a composition consisting of granular particles coated with a film. Numerous resins are satisfactory and, amongst them, there may be mentioned urea/formaldehyde, phenol/formaldehyde, furane and copolymer resins. These resins can be modified from dilutions up to complete copolymerisation, for example with furfuryl alcohol. It is also possible to use copolymers of these resins with epoxidised compounds or with unsaturated compounds; the silanisation of these resins by gamma-amino-propyl-triethoxysilane is generally desirable, but not indispensable.

The starting products which are capable of playing the role of acid curing agent after oxidation are chosen from amongst sulphuryl chloride and sulphur dioxide so that there is produced, after conversion, within the composition itself, nascent sulphuric acid which causes a very rapid but not instantaneous curing of the resins, without there being any intermediate formation of sulphur trioxide, the action of which is violent and unselective.

Sulphuryl chloride $SO_2Cl_2$, a liquid at ambient temperature, is injected into the shaped object in the form of an aerosol, the carrier gas of which can be air. Sulphuryl chloride is very easily hydrolysed into sulphuric acid and hydrochloric acid, which cause a very rapid curing, of the order of a few seconds, of the composition:

$$SO_2Cl_2 + 2H_2O \rightarrow H_2SO_4 + 2HCl$$

However, the action of these nascent sulphuric and hydrochloric acids manifests itself gradually, as the hydrolysis proceeds, which gives a graded curing, whilst with sulphur trioxide $SO_3$ the hydration is instantaneous and violent and of a very much more marked destructive nature It was found that the injection of a stream of air loaded with sulphuryl chloride into the composition made it unnecessary to incorporate an oxidising agent or a vehicle for oxygen into the aerosol or into the composition.

The use of sulphur dioxide $SO_2$ in the process according to the invention requires the incorporation of an oxidising agent or a vehicle for oxygen, to be introduced, for reasons of convenience, into the composition at the same time as the resin is mixed with the granular filler. The mixer then continuously discharges the mixture of sand, resin and oxidising agent directly into frames or cored boxes which pass in front of it. Numerous oxidising agents are suitable, and there may be mentioned peroxides, hydroperoxides, hydroxyhydroperoxides, chlorates, perchlorates, chlorites, hydrochlorides, perbenzoates, metal oxides, permanganates, monoperphthalic acid and the like, but, more particularly, the methyl ethyl ketone peroxide, hydrogen peroxide, and tertiary butyl hydroperoxide will preferably be used. These products, in which the proportion of active oxygen is high, are to be used in smaller amount than the products of the oxidation, autoxidation or photo-oxidation of furanes or of other autoxidable compounds such as cumene. The oxidation reactions of the latter products can furthermore optionally be sensitised by the addition of quinone or ketone compounds, or compounds of the eosin or proflavin type.

The amount of an oxidising agent or of a vehicle for oxygen in the composition or the injected gas, in the case where it is desired to use sulphur dioxide, can be greatly decreased by carrying out a sulphochlorination by the simultaneous action of $SO_2$ and $Cl_2$, or a sulphoxydation by the simultaneous action of $SO_2$ and $O_2$.

The introduction of gas into the shaped composition can be carried out by known processes in various ways depending of whether a mould or a core is being produced. In the case of a core, for example, the composition is shaped in its mould, which possesses orifices equipped with filters, connected to the outside, and through which the gas is introduced directly, under pressure, into the composition. During the production of a mould from the composition, the reverse procedure is followed, by clamping the mixture of sand and resin on a pattern and by introducing the gas via a plurality of channels machined in this pattern.

After manual, mechanical, hydraulic or pneumatic clamping of the composition consisting of granular filler, organic resin and, optionally, oxidising agent, the gas is injected at ambient temperature and at a pressure which can vary depending on the dimensions of the object to be manufactured. The pressure must be sufficient for the gas to be dispersed uniformly throughout the entire bulk of the composition and to escape to the outside of the mould. The pressures which are usually employed are between 0.3 and 5 atmospheres. The amount of sulphur dioxide $SO_2$ or of sulphuryl chloride $SO_2Cl_2$ to be employed is theoretically stoichiometric relative to the polymerisation reaction of the resin used. In pratice, amounts of it are used which vary from the stoichiometric amount to double that amount depending on whether or not agents with a definite function are incorporated into the composition; for example it was found that in the presence of a curing accelerator, of the monoperphthalic acid, benzenesulphonyl chloride, para-toluene-sulphonic acid, benzoquinone or hydroxylamine hydrochloride type, the consumption of sulphur dioxide or of sulphuryl chloride can be decreased by 50%.

Sulphuryl chloride acting alone or composition comprising a filler and a resin, or sulphur dioxide acting on a composition into which an oxidising agent of the peroxide or hydrogen peroxide type has also been incorporated, give substantially the same results with regard to the quality of the article obtained. However, in many cases, the second solution, which is more manageable since it does not use chlorine, wil be preferred. Furthermore, it is easier to handle $SO_2$ gas than $SO_2 Cl_2$, since the latter compound is a liquid at ordinary temperature. In order to improve the process conditions, it is also possible to absorb sulphuryl chloride in a capsule containing a silica gel. The gas mixture is then desorbed by a stream of air immediately before use. It is also possible to dilute the gas used with nitrogen or carbon dioxide in order to assist the dispersion of $SO_2$ or $SO_2Cl_2$ throughout the composition, and thus to reduce the consumption.

It should be noted that this treatment in no way modifies the working life of sand which is, because of the absence of curing agent in the composition itself, practically unlimited until the gas is introduced, this being the operation by which the curing agent is incorporated. In a final stage of the manufacture, it is advisable to pass in a stream of air or neutral gas which washes the sand and carries the excess $SO_2$ or $SO_2Cl_2$ over into a neutralisation tank, which prevents any harm or atmospheric pollution.

The aim of the present invention is thus to provide a process for curing a composition consisting of a granular filler and a synthetic resin containing an acid curing agent, the said curing being achieved by means of at least the sulphuric acid formed in situ from sulphur dioxide or from a derivative of sulphur dioxide such as sulphuryl chloride, each of these constitutents making it possible to form nascent sulphuric acid within the composition itself, without the intermediate formation of sulphur trioxide, the action of which is too violent and lacks selectivity.

The main aim of the present invention is thus to form, within the composition, a compound which has a level of oxidation (+ VI) with lower reactivity than that of sulphur trioxide, $SO_3$, the level of oxidation of which is also (+ VI) but which is a compound which has the double disadvantage of being unstable and of combining with water to give an excessively violent reaction.

An oxygen-containing compound of sulphur is used, the action of which is slowed down relative to that of $SO_3$; this additive, by itself ($SO_2Cl_2$) or by its action on an oxidising agent ($SO_2$), reacts to form sulphuric acid in situ : as a result, a product ($SO_2Cl_2$) is used, the reactivity of which is also lower than that of sulphur trioxide, or else the compound which is initially active is manufactured within the composition ($SO_2 \rightarrow H_2SO_4$). Thus, either an active compound with a level of oxidation (+ VI) is formed before introduction into the mould, and in this case the active compound is less active than sulphur trioxide, or the active compound with a level of oxidation (+VI) is formed within the composition itself.

The process according to the invention has the advantage that sulphuric acid, which is a dehydrating agent, the reaction of which is less marked (less violent and more selective) than sulphur trioxide, is formed in situ.

According to a first method, sulphuric acid is formed from a compound which already has a level of oxidation (+ VI) and which, in the presence of the traces of water, is slowly converted into sulphuric acid; this compound, sulphuryl chloride, is a liquid compound which is produced by the addition reaction, under dry conditions, in sunlight, between chlorine and sulphur dioxide, according to the reaction:

$$SO_2 + Cl_2 + h\nu \rightarrow SO_2Cl_2$$

In this case, the activation takes place prior to the introduction of the areosol into the composition.

In a second method proposed according to the present invention, sulphuric acid is obtained from an oxygen-containing product of sulphur, the level oxidation of which is (+ IV), this being an oxygen-containing product which, in the presence of an oxidising agent and traces of water, causes the formation of sulphuric acid with a level of oxidation (+ VI), this conversion taking place gradually within the composition itself.

In the particular case of sulphur dioxide, hydration of the latter takes place first of all within the composition (gradual hydration, which does not assume the violence of that of sulphur trioxide), followed by oxidation of the sulphurous acid formed, either by formation of free radicals, or by formation of complexes. In every case, sulphuric acid forms in situ without intermediate formation of sulphur trioxide:

a. with hydroperoxides, the following reaction takes place. (KHARASH, J. amer. Chem. Soc. 1939, 61, 3092):

$$SO_2 + H_2O \rightarrow HSO_3^- + H^+$$
$$ROOH + HSO_3^- \rightarrow HSO_3' + RO' + OH^+$$
$$ROOH + HSO_3' \rightarrow H_2SO_4 + RO'$$

b. with oxidising agents of the chlorate type, a complex forms which rearranges to give sulphuric acid according to (HALPERIN, J. amer. chem. Soc. 1952, 74, 379):

$$SO_2 + H_2O \rightarrow HSO_3^- + {}_H{}^+$$
$$ClO_3{}'' + HSO_3^- \rightarrow ClO_2SO_3H + OH^-$$
$$ClO_2SO_3H + H_2O \rightarrow H_2SO_4 + HClO_2$$

The absence of intermediate formation of sulphur trioxide has been verified frequently and the technology of the manufacture of sulphuric acid by the process using nitrogen oxides, the so-called "lead chamber process" provides another example of such a conversion of $SO_2$ into $H_2SO_4$ without the intermediate formation of $SO_3$. In effect, according to BERL's theory, the following series of reactions takes place:

$$SO_2 + H_2O \rightarrow H_2SO_3$$
$$H_2SO_3 + NO_2 \rightarrow H_2SO_3.NO_2 \rightarrow H_2SO_4.$$
$$NO \rightarrow H_2SO_4 + NO$$

The complex $H_2SO_3 . NO_2$, formed by the addition of $NO_2$ to $H_2SO_3$, rearranges to give sulphonitronic acid or violet acid $H_2SO_4$. NO, a very unstable compound which decomposes into sulphuric acid and nitric oxide. Nitric oxide is easily reoxidised by air:

$$NO + \tfrac{1}{2}O_2 \rightarrow NO_2$$

Nitrogen dioxide is thus constantly regenerated. In conclusion, the curing of the resin takes place by the action of sulphuric acid formed either from a single component which is a chemical compound ($SO_2Cl_2$), or from sulphur dioxide gas, which is a stable compound and a reducing agent, introduced into the composition simultaneously with an oxidising gas such as chlorine for example, or preferably, from sulphur dioxide introduced in the form of a gas into a composition which has been initially shaped so that it contains the sand, the resin and an oxidising agent (peroxide, hydroperoxide or hydrogen peroxide), this oxidising agent, which is reactive towards sulphur dioxide, being distributed in a homogeneous and uniform manner throughout the composition in order that the curing, brought about after a few seconds, after the passage of $SO_2$ between the interstices of the composition, is itself uniform.

The different examples given below show the various possibilities for the process which has just been described. The flexural strength results mentioned were obtained according to the D.I.N. German Standard Specification.

EXAMPLE 1

A composition is used which comprises siliceous sand to which there has been added:
2% of a furane/urea/formaldehyde resin or 1% of a furane/urea/formaldehyde resin containing traces of gamma-aminopropyl-triethoxysilane;
0.3% of methyl ethyl ketone peroxide.
The cores or moulds produced with this mixture which has an unlimited lifetime, are then gassed with a stream of $SO_2$ for 1 to 5 seconds, and flexural strengths of the order of 30 kg/cm² are obtained.

EXAMPLE 2

A composition of siliceous sand is used, to which there have been added:
1% of a phenolic resin copolymerised with furfuryl alcohol, with addition of gamma-aminopropyl-triethoxysilane;
0.3% of tertiary butyl hydroperoxide.
The moulded products, produced with this mixture which has an unlimited lifetime, are then gassed with a stream of $SO_2$ for 1 to 5 seconds and flexural strengths of the order of 35 kg/cm² are obtained.

EXAMPLE 3

A composition of siliceous sand is used to which there have been added:
1% of a silanised furfuryl alcohol polymer;
0.15% of hydrogen peroxide (70% strength $H_2O_2$).
The moulded products, produced with this mixture which has an unlimited lifetime, are then gassed with a stream of $SO_2$ for 1 to 5 seconds and flexural strengths of the order of 45 kg/cm² are obtained.

EXAMPLE 4

A composition of siliceous sand is used to which there have been added:
1% of a furane resin copolymerised with epoxy compounds and silanised;
0.15% of hydrogen peroxide (70% strength $H_2O_2$).
The moulded products, produced with this mixture which has an unlimited lifetime, are then gassed with a stream of $SO_2$ for 1 to 5 seconds and flexural strengths of the order of 45 kg/cm² are obtained.

EXAMPLE 5

A composition of siliceous sand is used to to which there has been added:
1% of a furane resin copolymerised with unsaturated compounds.

The moulded products, produced with this mixture which has an unlimited lifetime, are gassed with a stream or air loaded with $SO_2Cl_2$ for 1 to 5 seconds and flexural strengths of the order of 48 kg/cm$^2$ are obtained.

EXAMPLE 6

One of the resins described in Examples 1 to 5 is used as a mixture with siliceous sand to which benzene sulphochloride and 0.10% of $H_2O_2$ have been added.

The introduction of gas is identical to the above examples, but with amounts of $SO_2$ which are reduced by 50%.

EXAMPLE 7

For manufacturing refractory products, a composition is used which comprises refractory masses (zirconium oxide, chamotte, sillimanite and the like) to which different resins and their agents with a definite function as described in Examples 1 to 6 have been added. Gassing with $SO_2$, $SO_2Cl_2$, sulphoxidation and sulphochlorination all lead to objects of which the refractory point is not affected.

EXAMPLE 8

For manufacturing construction materials (bricks, bondstones, paving-stones, slabs and the like), a composition is used which comprises sands or gravels to which one or more resins have been added in an amount of between 1 and 10%, depending on the mechanical strength required, as well as at least one of the agents with definite functions as described in Examples 1 to 6; gassings with $SO_2$, $SO_2Cl_2$, sulphoxidation or sulphochlorination all lead to cast articles or materials which can be employed immediately without the usual long period of drying or curing.

In all these used examples of the process according to the invention, the life of the sand before gassing with $SO_2$ or with $SO_2Cl_2$ is unlimited. In contrast, after this gassing, a violent exothermic reaction takes place which further increases the rapidity of the curing since it generally takes place in a period of time of between 1 to 5 seconds. If a slower setting is desired, it is sufficient to reduce the proportions of $SO_2$ and oxidising agent, or the proportions of $SO_2Cl_2$.

Of course, although the invention has been described with reference to particular examples and methods of carrying it out, it also covers minor changes which can be introduced into the process as well as the incorporation into the composition or into the gas of other agents with a definite function, the role of which is to react with one of the constituents of the composition to form at least one strong acid which is capable of polymerising the resin in a very short period of time.

I claim:

1. Process for the manufacture of solid or hollow bodies, used especially for coring and moulding in founding, as well as for the manufacture of refractory products, abrasive products such as grinding wheels moulded or cast construction materials for building and civil engineering, from a composition comprising at least one granular filler which is intimately mixed with at least one acid curing organic resin which comprise, after shaping and clamping the said composition, curing of the said resin at ambient temperature and over a period of between a few seconds and a few minutes, by adding gaseous or aerosol sulfur dioxide after first incorporating in said composition before shaping an oxidizing agent in a liquid or solid form which reacts with sulfur dioxide to form sulfuric acid without forming sulfur trioxide.

2. Process according to claim 1 wherein the oxidising agent is from the group consisting of peroxide, hydroperoxide, hydroxy-hydroperoxide, chlorate, perchlorate, chlorite, hydrochloride, perbenzoate, metal oxide, permanganate and monoperiphthalic acid, the said oxidising agent being mixed, in the liquid or solid form, with the composition comprising the granular filler and the synthetic resin, before its shaping.

3. Process according to claim 1 wherein the oxidising agent which is introduced first into the composition is methyl ethyl ketone peroxide.

4. Process according to claim 1, wherein the oxidising agent is a product of oxidation, autooxidation or photo-oxidation of furanes.

5. Process according to claim 1 wherein the oxidising agent is an autoxidation product of cumene.

6. Process according to claim 1 wherein the oxidising agent is an autoxidation product of cumene sensitized by the addtion of quinoid, ketone, eosin or proflavin compounds.

7. Process according to claim 1 wherein the oxidising agent which is introduced first into the composition is hydrogen peroxide.

8. Process according to claim 1 wherein the oxidising agent which is introduced first into the composition is tertiary butyl hydroperoxide.

* * * * *

UNITED STATES PATENT AND TRADEMARK OFFICE
CERTIFICATE OF CORRECTION

PATENT NO. : 3,879,339
DATED : April 22, 1975
INVENTOR(S) : GERARD Y. RICHARD

It is certified that error appears in the above-identified patent and that said Letters Patent are hereby corrected as shown below:

Column 4, line 38, after "and" insert --furane--.

Column 6, line 5, before "composition" cancel "or" and insert --on a--

Column 7, line 41, the first line of the reaction should read:
$$--SO_2 + H_2O \longrightarrow HSO_3^- + H^{\pm} --$$

Column 10, line 14, "comprise" should read --comprises--.

Signed and Sealed this twenty-third Day of December 1975

[SEAL]

Attest:

RUTH C. MASON
Attesting Officer

C. MARSHALL DANN
Commissioner of Patents and Trademarks